(12) United States Patent
Lou et al.

(10) Patent No.: US 12,047,982 B2
(45) Date of Patent: Jul. 23, 2024

(54) COMMUNICATION METHOD AND COMMUNICATIONS APPARATUS

(71) Applicant: Huawei Technologies Co., Ltd., Shenzhen (CN)

(72) Inventors: Chong Lou, Shanghai (CN); Xing Liu, Shenzhen (CN); Qufang Huang, Shenzhen (CN); Xiaoying Xu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 628 days.

(21) Appl. No.: 17/214,786

(22) Filed: Mar. 26, 2021

(65) Prior Publication Data
US 2021/0219300 A1 Jul. 15, 2021

Related U.S. Application Data

(63) Continuation of application No. PCT/CN2019/107875, filed on Sep. 25, 2019.

(30) Foreign Application Priority Data

Sep. 28, 2018 (CN) .......................... 201811139821.8

(51) Int. Cl.
*H04W 72/14* (2009.01)
*H04L 1/00* (2006.01)
(Continued)

(52) U.S. Cl.
CPC ........... *H04W 72/53* (2023.01); *H04L 1/0003* (2013.01); *H04L 1/203* (2013.01);
(Continued)

(58) Field of Classification Search
CPC ..... H04L 1/203; H04L 1/0003; H04L 1/1893; H04L 1/1887; H04L 5/0044;
(Continued)

(56) References Cited

U.S. PATENT DOCUMENTS 11,553,511 B2 * 1/2023 Bai ..................... H04L 1/0026
2014/0192686 A1 7/2014 Hammarwall et al.
(Continued)

FOREIGN PATENT DOCUMENTS

CN 107027189 A 8/2017
CN 108207032 A 6/2018
(Continued)

OTHER PUBLICATIONS

Huawei, HiSilicon, "Potential RAN1 impacts on intra-UE prioritization," 3GPP TSG RAN WG1 Meeting #94, Gothenburg, Sweden, R1-1809347, total 10 pages, 3rd Generation Partnership Project, Valbonne, France (Aug. 20-24, 2018).
(Continued)

*Primary Examiner* — Syed Ali
(74) *Attorney, Agent, or Firm* — Leydig, Voit & Mayer, Ltd.

(57) ABSTRACT

This application provides a communication method and a communications apparatus, to provide a solution for processing a conflict between uplink resources. The method includes: a terminal device obtains a first uplink resource, where the first uplink resource is used to send a first service. The terminal device obtains a second uplink resource, where the second uplink resource is used to send a second service, and the first uplink resource and the second uplink resource completely or partially overlap in a time domain. The terminal device determines a target uplink resource to be used in the time domain, where the target uplink resource is the first uplink resource or the second uplink resource. The terminal device sends data on the target uplink resource in the time domain.

20 Claims, 5 Drawing Sheets

(51) Int. Cl.
*H04L 1/20* (2006.01)
*H04W 72/0446* (2023.01)
*H04W 72/21* (2023.01)
*H04W 72/23* (2023.01)
*H04W 72/53* (2023.01)
*H04W 80/02* (2009.01)

(52) U.S. Cl.
CPC ....... *H04W 72/0446* (2013.01); *H04W 72/21* (2023.01); *H04W 72/23* (2023.01); *H04W 80/02* (2013.01)

(58) Field of Classification Search
CPC .......... H04L 1/1822; H04W 72/0446; H04W 72/23; H04W 72/21
See application file for complete search history.

(56) References Cited

U.S. PATENT DOCUMENTS

| | | | |
|---|---|---|---|
| 2017/0367110 A1 | 12/2017 | Li et al. | |
| 2018/0270707 A1* | 9/2018 | Seo | H04W 28/06 |
| 2018/0368133 A1* | 12/2018 | Park | H04L 5/0064 |
| 2019/0028980 A1* | 1/2019 | Feuersaenger | H04W 52/281 |
| 2019/0149273 A1* | 5/2019 | Golitschek Edler von Elbwart | H04L 1/1864 714/748 |
| 2019/0288789 A1* | 9/2019 | Li | H04W 72/20 |
| 2021/0068114 A1* | 3/2021 | Xu | H04W 72/0446 |
| 2021/0144796 A1* | 5/2021 | Wu | H04W 72/23 |
| 2021/0195584 A1* | 6/2021 | You | H04L 5/0053 |
| 2021/0298052 A1* | 9/2021 | Namba | H04L 1/1851 |
| 2021/0410069 A1* | 12/2021 | Jo | H04W 72/23 |
| 2022/0039100 A1* | 2/2022 | Yoshioka | H04W 72/543 |
| 2023/0309102 A1* | 9/2023 | Park | H04W 72/21 370/329 |

FOREIGN PATENT DOCUMENTS

| | | |
|---|---|---|
| CN | 108513732 A | 9/2018 |
| CN | 108738135 A | 11/2018 |
| WO | 2017134527 A1 | 8/2017 |
| WO | 2018082043 A1 | 5/2018 |

OTHER PUBLICATIONS

Ericsson, "SPS Protocol for Uu", 3GPP TSG-RAN WG2 #97, Athens, Greece, R2-1700926, 2 pages, 3rd Generation Partnership Project, Valbonne, France (Feb. 13-17, 2017).

"3rd Generation Partnership Project; Technical Specification Group Radio Access Network; NR; Medium Access Control (MAC) protocol specification(Release 15)", 3GPP TS 38.321 V15.3.0, 76 pages, 3rd Generation Partnership Project, Valbonne, France (Sep. 2018).

Ericsson, "Conflict handling for multiple UL SPS configurations", 3GPP TSG-RAN WG2 #103, Gothenburg, Sweden, R2-1812119, 4 pages, 3rd Generation Partnership Project, Valbonne, France (Aug. 20-24, 2018).

"3rd Generation Partnership Project; Technical Specification Group Radio Access Network; NR; NR and NG-RAN Overall Description; Stage 2(Release 15)", 3GPP TS 38.300 V15.3.0, 92 pages, 3rd Generation Partnership Project, Valbonne, France (Sep. 2018).

* cited by examiner

COMMUNICATION METHOD AND COMMUNICATIONS APPARATUS

CROSS-REFERENCE TO RELATED APPLICATIONS

This application is a continuation of International Application No. PCT/CN2019/107875, filed on Sep. 25, 2019, which claims priority to Chinese Patent Application No. 201811139821.8, filed on Sep. 28, 2018. The disclosures of the aforementioned applications are hereby incorporated by reference in their entireties.

TECHNICAL FIELD

This application relates to the communications field, and in particular, to a communication method and a communications apparatus.

BACKGROUND

In a communication process, a network device configures an uplink transmission resource for a terminal device, and the terminal device may transmit uplink data on the uplink transmission resource. The uplink data may correspond to different services. The services may include, for example, an ultra-reliable and low-latency communication (URLLC) service or an enhanced mobile broadband (eMBB) service proposed in a fifth generation mobile communications technology (5G), or may include a service of another type. When the terminal device needs to simultaneously transmit two or more services, if uplink transmission resources used for different services conflict with each other, how to perform data transmission in a conflict scenario is an urgent problem to be resolved in the industry.

SUMMARY

In view of this, embodiments of this application provide a communication method and a communications apparatus, to provide a possible solution to a scenario in which uplink resources conflict with each other.

According to a first aspect, this application provides a communication method, including: a terminal device obtains a first uplink resource, where the first uplink resource is used to send a first service. The terminal device obtains a second uplink resource, where the second uplink resource is used to send a second service, and the first uplink resource and the second uplink resource completely or partially overlap in a time domain. The terminal device determines a target uplink resource to be used in an overlapping time domain, where the target uplink resource is the first uplink resource or the second uplink resource. The terminal device sends data on the target uplink resource in the overlapping time domain.

In this embodiment of this application, when the uplink resources for different services conflict in time domain, the terminal device may flexibly select the target uplink resource from the first uplink resource or the second uplink resource based on a determining condition, and transmit the data on the target uplink resource in the overlapping time domain, thereby providing a solution to a conflict between the uplink resources.

In a possible implementation, that the terminal device determines a target uplink resource to be used in an overlapping time domain includes: when at least one of the following conditions is met, the terminal device determines the second uplink resource as the target uplink resource: physical uplink shared channel PUSCH duration of the second uplink resource is less than PUSCH duration of the first uplink resource; a target block error rate corresponding to a modulation and coding scheme MCS table of the second uplink resource is less than a target block error rate corresponding to an MCS table of the first uplink resource; and a priority of a logical channel transmitted on the second uplink resource is higher than a priority of a logical channel transmitted on the first uplink resource.

In this embodiment of this application, when the uplink resources for different services conflict in the time domain, the terminal device may flexibly select the target uplink resource from the first uplink resource or the second uplink resource based on the PUSCH duration corresponding to the uplink resources, the target block error rates corresponding to the MCS tables corresponding to the uplink resources, or the priorities of the logical channels corresponding to the uplink resources, and transmit the data on the target uplink resource in the overlapping time domain, thereby providing the solution to the conflict between the uplink resources.

In a possible implementation, that a terminal device obtains a first uplink resource includes: the terminal device receives first control information from a network device, where the first control information is used to indicate the first uplink resource allocated to the terminal device. That the terminal device obtains a second uplink resource includes: The terminal device receives second control information from the network device, where the second control information is used to indicate the second uplink resource allocated to the terminal device.

In this embodiment of this application, when two dynamically scheduled uplink resources conflict in the time domain, the terminal device may flexibly select the target uplink resource from the first uplink resource or the second uplink resource based on the determining condition, and transmit the data on the target uplink resource in the overlapping time domain, thereby providing the solution to the conflict between the uplink resources.

In a possible implementation, that the terminal device determines a target uplink resource to be used in an overlapping time domain includes: when a time-domain position of the second control information is after that of the first control information, the terminal device determines the second uplink resource as the target uplink resource.

In a possible implementation, the second uplink resource is a preconfigured uplink grant resource. That a terminal device obtains a first uplink resource includes: the terminal device receives first control information from a network device, where the first control information is used to indicate the first uplink resource allocated to the terminal device.

In this embodiment of this application, when a dynamically scheduled uplink resource conflicts with the preconfigured uplink grant resource in the time domain, the terminal device may flexibly select the target uplink resource from the first uplink resource or the second uplink resource based on the determining condition, and transmit the data on the target uplink resource in the overlapping time domain, thereby providing the solution to the conflict between the uplink resources.

In a possible implementation, the target uplink resource is the second uplink resource, a hybrid automatic repeat request HARQ process of the first uplink resource is the same as that of the second uplink resource, and the method further includes: the terminal device skips starting or skips restarting a timer of the HARQ process.

In this embodiment of this application, when the dynamically scheduled resource conflicts with the preconfigured grant resource, the terminal device may determine whether to start or restart the timer of the corresponding HARQ process, to resolve a problem that after the target uplink resource is selected, the data may fail to be transmitted because the timer of the HARQ process is started.

In a possible implementation, the target uplink resource is the second uplink resource, the HARQ process of the first uplink resource is the same as that of the second uplink resource, and the method further includes: the terminal device discards the first uplink resource.

In a possible implementation, the target uplink resource is the second uplink resource, a HARQ process of the first uplink resource is different from that of the second uplink resource, and the method further includes: the terminal device sends data of the first service on a resource other than a third uplink resource in the first uplink resource, where the third uplink resource is a resource that is in the first uplink resource and that overlaps the second uplink resource in time domain.

According to a second aspect, this application provides a communication method, including: a terminal device determines to-be-sent first data, where the first data is configured to be repeatedly sent for K consecutive times in K positions on an uplink resource, and K is an integer greater than or equal to 2. The terminal device determines to-be-sent second data, where a latency requirement of the second data is higher than a latency requirement of the first data. The terminal device transmits the second data in a part of the K positions on the uplink resource.

In this embodiment of this application, the terminal device may send the second data on a part of the uplink resource configured to send the first data, to reduce a latency of sending the second data, and improve communication efficiency.

In a possible implementation, that the terminal device transmits the second data in a part of the K positions on the uplink resource includes: the terminal device transmits the first data in the first M of the K positions on the uplink resource, and transmits the second data in the last K−M of the K positions on the uplink resource, where M is an integer greater than or equal to 1, and M<K.

According to a third aspect, this application provides a communications apparatus. The apparatus has functions of implementing the terminal device according to the first aspect or the second aspect. The functions may be implemented by hardware, or may be implemented by hardware executing corresponding software. The hardware or the software includes one or more units corresponding to the foregoing functions.

According to a fourth aspect, this application provides a communications apparatus, including a processor and an interface circuit. The processor is configured to: communicate with another apparatus through the interface circuit, and perform the method according to the first aspect or the second aspect. There may be one or more processors.

According to a fifth aspect, this application provides an apparatus. The apparatus includes a processor, configured to: connect to a memory, and read and execute a program stored in the memory, to implement the method according to the first aspect or the second aspect. The memory may be located inside the apparatus, or may be located outside the apparatus. There may be one or more processors.

According to a sixth aspect, this application provides a computer program, where when being executed by a processor, the program is configured to perform the method according to the first aspect or the second aspect.

According to a seventh aspect, this application provides a computer program product. The computer program product includes computer program code; and when being run, the computer program code is used to perform the method performed by the terminal device according to the first aspect or the second aspect.

According to an eighth aspect, this application provides a chip system. The chip system includes a processor, configured to implement functions of the terminal device in the methods in the foregoing aspects, for example, receive or process data and/or information in the foregoing methods. In a possible design, the chip system further includes a memory. The memory is configured to store a program instruction and/or data. The chip system may include a chip, or may include a chip and another discrete component.

According to a ninth aspect, this application provides a computer-readable storage medium. The computer-readable storage medium stores a computer program; and when the computer program is run, the methods performed by the terminal device in the foregoing aspects are implemented.

DESCRIPTION OF EMBODIMENTS

The following describes technical solutions of this application with reference to the accompanying drawings.

The technical solutions of embodiments of this application may be used in various communications systems, such as a long term evolution (LTE) system, an LTE frequency division duplex (FDD) system, an LTE time division duplex (TDD) system, a worldwide interoperability for microwave access (WiMAX) communications system, and a 5th generation (5G) system or a new radio (NR) system.

A terminal device in the embodiments of this application may be user equipment, an access terminal, a subscriber unit, a subscriber station, a mobile station, a remote station, a remote terminal, a mobile device, a user terminal, a terminal, a wireless communications device, a user agent, or a user apparatus. The terminal device may alternatively be a cellular phone, a cordless telephone set, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, a terminal device in a future evolved public land mobile network (PLMN), or the like. This is not limited in the embodiments of this application.

A network device in the embodiments of this application may be a device configured to communicate with the terminal device. The network device may be an evolved NodeB (eNB or eNodeB) in the LTE system, or may be a radio controller in a cloud radio access network (CRAN) scenario. Alternatively, the network device may be a relay station, an access point, a vehicle-mounted device, a wearable device, a network device in the future 5G network, a network device in the future evolved PLMN, or the like. This is not limited in the embodiments of this application.

Figure 1:
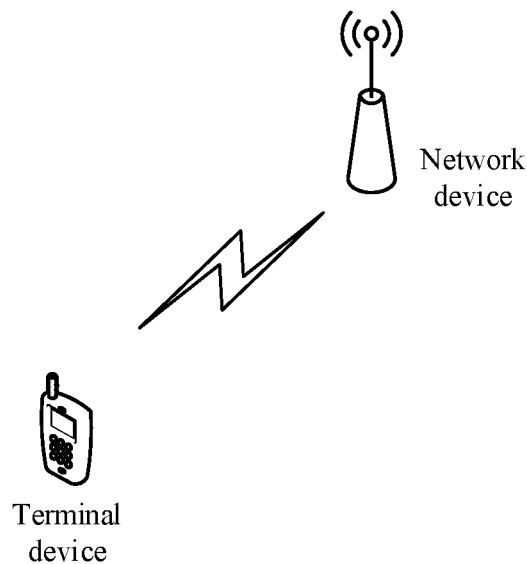
FIG. 1 is a schematic diagram of an application environment according to an embodiment of this application.

FIG. 1 is a schematic diagram of a possible application scenario according to an embodiment of this application. As shown in FIG. 1, the application scenario may include a terminal device and a network device. For specific descriptions of the terminal device and the network device, refer to the foregoing related descriptions. In an example, the terminal device may be a mobile terminal, and the network device may be an access network device. As shown in FIG. 1, the terminal device may access a network through the network device, and the terminal device and the network device may communicate with each other over a radio link. FIG. 1 is not limited to a scenario in which one network device communicates with the terminal device. The application scenario in this embodiment of this application may further include a carrier aggregation scenario, a dual connectivity scenario, or a coordinated multipoint transmission/reception scenario.

Figure 2:
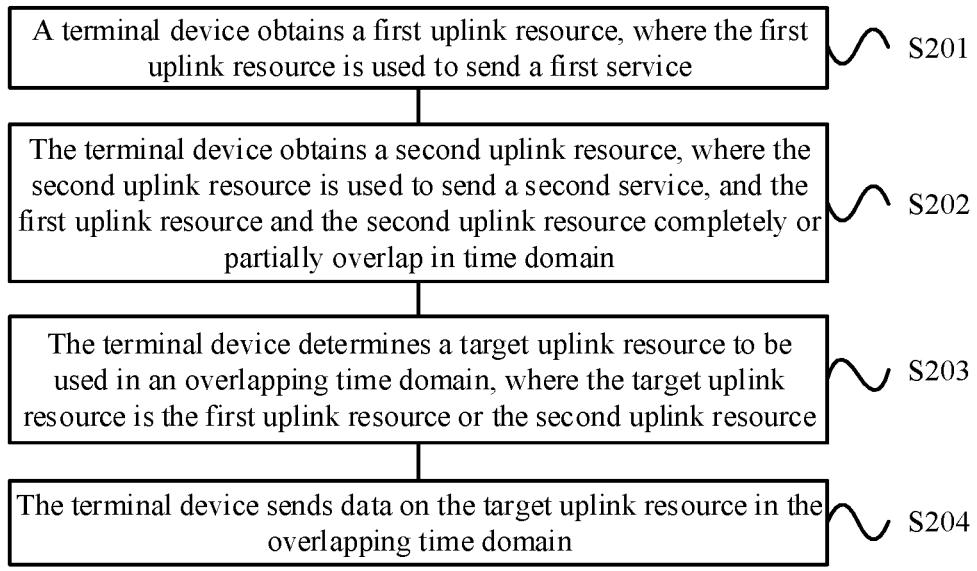
FIG. 2 is a schematic diagram of a communication method according to an embodiment of this application.

FIG. 2 is a schematic diagram of a communication method according to an embodiment of this application. The method in FIG. 2 may be performed by a terminal device, or may be performed by a chip in a terminal device. The following uses the terminal device as an example for description. The method in FIG. 2 includes the following steps.

S201: The terminal device obtains a first uplink resource, where the first uplink resource is used to send a first service.

That the terminal device obtains a first uplink resource may include that the terminal device obtains a dynamically scheduled resource, or that the terminal device obtains a preconfigured grant resource. The preconfigured grant resource may be, for example, periodic.

Optionally, dynamic scheduling may mean that a network device sends downlink control information (DCI) to the terminal device, to directly indicate an uplink resource by using the DCI. The uplink resource indicated in this manner may be used for one time. In an example, if the first uplink resource is dynamically scheduled, that the terminal device obtains a first uplink resource includes: the terminal device receives first control information from the network device. Correspondingly, the network device sends the first control information to the terminal device, where the first control information is used to indicate the first uplink resource allocated to the terminal device. The first control information may be DCI.

Optionally, the preconfigured grant resource may be configured in two manners. In a first manner, the network device may configure a periodicity and a start offset of the uplink resource by using radio resource control (RRC) signaling, and may further indicate a specific position of the uplink resource by using the RRC signaling. This resource configuration manner may be referred to as a type 1 configured grant. In a second manner, the network device may configure a periodicity and a start offset of the uplink resource by using radio resource control (RRC) signaling, and then indicate a specific position of the uplink resource by using DCI. This resource configuration manner may be referred to as a type 2 configured grant. Before the terminal device receives a deactivation command from the network device, the preconfigured uplink resource may be periodic. The deactivation command is used to indicate that allocation of the uplink resource to the terminal device is stopped.

S202: The terminal device obtains a second uplink resource, where the second uplink resource is used to send a second service, and the first uplink resource and the second uplink resource completely or partially overlap in time domain.

Optionally, a manner of obtaining the second uplink resource by the terminal device is similar to the manner of obtaining the first uplink resource by the terminal device. In other words, the second uplink resource may be a dynamically scheduled resource, or may be a preconfigured grant resource. For example, both the first uplink resource and the second uplink resource may be dynamically scheduled resources. Alternatively, the first uplink resource may be a dynamically scheduled resource, and the second uplink resource may be a preconfigured grant resource. Alternatively, the first uplink resource is a preconfigured grant resource, and the second uplink resource is a dynamically scheduled resource. Alternatively, both the first uplink resource and the second uplink resource may be preconfigured grant resources.

Optionally, that the first uplink resource is used to send a first service may mean that the first uplink resource is used to send data of the first service. That the second uplink resource is used to send a second service may mean that the second uplink resource is used to send data of the second service.

Optionally, the first service and the second service have different latency or reliability requirements. Alternatively, logical channels corresponding to the first service and the second service have different priorities.

Optionally, types of the first service and the second service may be different or may be the same. For example, the first service may be an eMBB service, and the second service may be a URLLC service. Alternatively, both the first service and the second service may be URLLC services. Alternatively, the first service and the second service may be services of other types. Details are not described herein.

Optionally, that the first uplink resource and the second uplink resource completely or partially overlap in time domain may be understood as that the first uplink resource conflicts with the second uplink resource in time domain. In other words, the uplink resource used to transmit the first service conflicts, in time domain, with the uplink resource used to transmit the second service. Optionally, the first uplink resource and the second uplink resource may completely or partially overlap in frequency domain, or may not overlap in frequency domain.

Optionally, the terminal device may obtain the first uplink resource and the second uplink resource in a sequence. For example, the terminal device first receives DCI used to dynamically schedule the first uplink resource, and then receives DCI used to dynamically schedule the second uplink resource. Alternatively, the terminal device first receives DCI used to dynamically schedule the second uplink resource, and then receives DCI used to dynamically schedule the first uplink resource.

Figure 3:
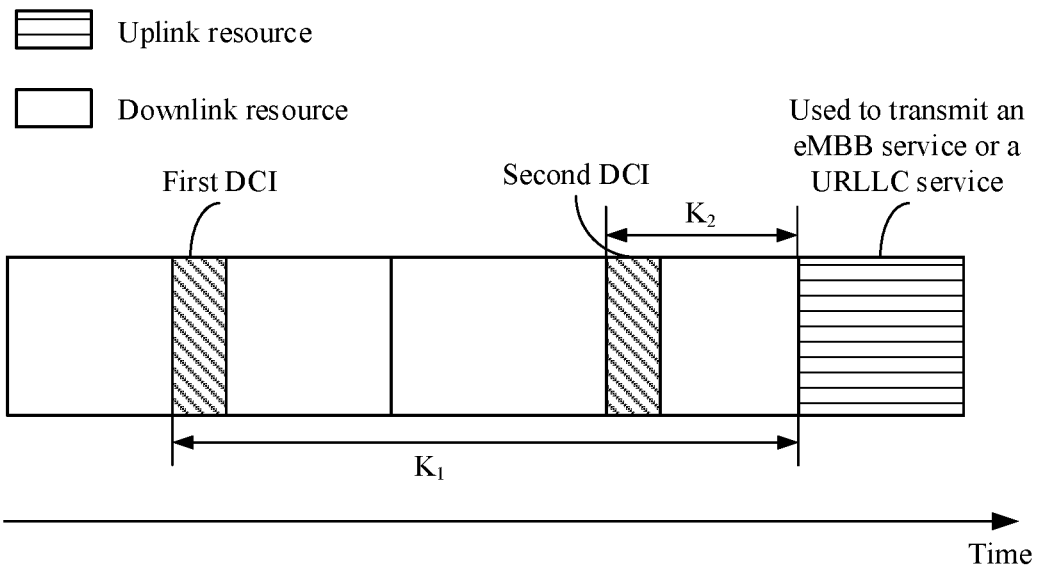
FIG. 3 is a schematic diagram of resource distribution according to an embodiment of this application.

In an example, FIG. 3 is a schematic diagram of resource distribution according to an embodiment of this application. In a scenario in FIG. 3, both the first uplink resource and the second uplink resource are dynamically scheduled resources. The first service may be an eMBB service, and the second service may be a URLLC service. As shown in FIG. 3, the network device may send first DCI on a downlink resource, where the first DCI indicates a specific position of the first uplink resource allocated to the eMBB service. For example, the first DCI may indicate that the position of the first uplink resource is after $K_1$ time units after the first DCI. $K_1$ indicates a time-domain distance between the first DCI and the first uplink resource. The network device may further send second DCI on a downlink resource, where the second DCI indicates a specific position of the second uplink resource allocated to the URLLC service. For example, the second DCI may indicate that the position of the second uplink resource is after $K_2$ time units after the second DCI. It can be learned from FIG. 3 that the first uplink resource and the second uplink resource completely or partially overlap in time domain.

Figure 4:
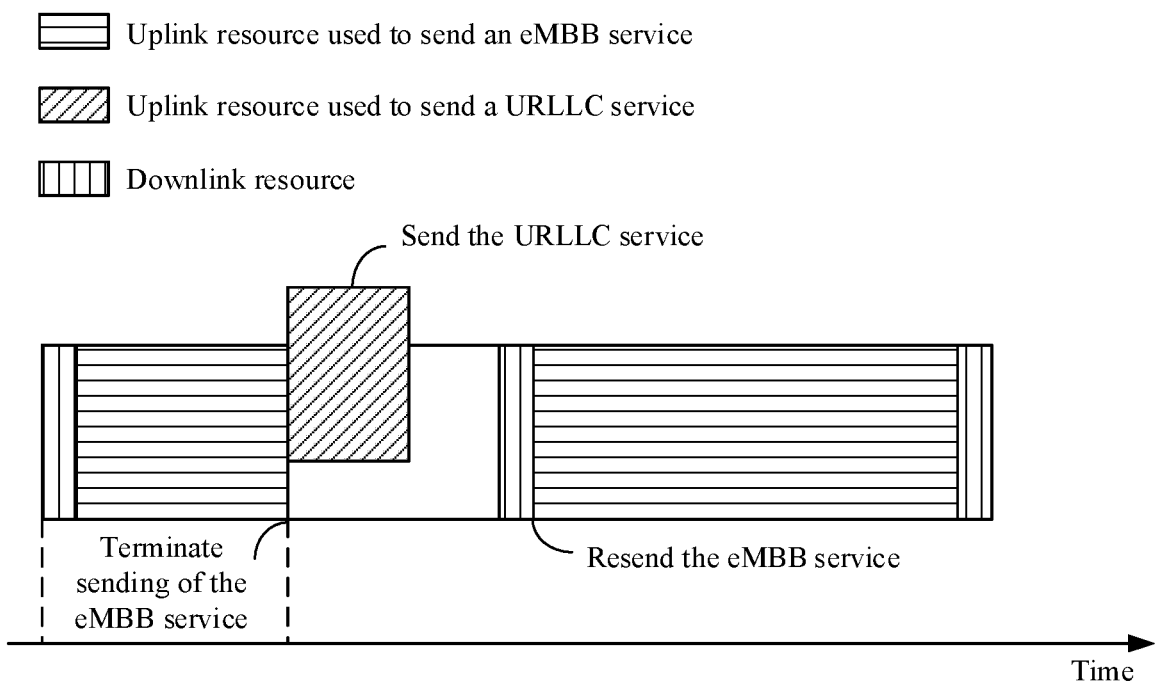
FIG. 4 is a schematic diagram of resource distribution according to another embodiment of this application.

In another example, FIG. 4 is a schematic diagram of resource distribution according to another embodiment of this application. In a scenario in FIG. 4, the first uplink resource may be a dynamically scheduled resource, and the second uplink resource may be a preconfigured grant resource. The first service may be an eMBB service, and the second service may be a URLLC service. The terminal device may first receive DCI sent by the network device, to obtain the first uplink resource. Then, if the terminal device needs to send the URLLC service, a resource conflict occurs because the second uplink resource used to send the URLLC service and the first uplink resource used to send the eMBB service completely or partially overlap in time domain.

S203: The terminal device determines a target uplink resource to be used in an overlapping time domain, where the target uplink resource is the first uplink resource or the second uplink resource.

In some cases, the terminal device can send data on only one carrier at the same time. If uplink resources used to transmit different services conflict in time domain, the terminal device may usually choose to transmit, on a conflicting time domain resource, a service that is first allocated. However, in this manner, if a service whose transmission is terminated on the conflicting time domain resource has a relatively high latency requirement, performance of the service and user experience are affected. In S203, the terminal device may select the target uplink resource from the first uplink resource and the second uplink resource, and transmit the corresponding service on the target uplink resource in the overlapping time domain. Therefore, when the uplink resources conflict, the terminal device may flexibly select the first uplink resource or the second uplink resource to transmit the corresponding service in the overlapping time domain, thereby improving communication efficiency. In other words, the terminal device successively obtains two uplink resources. When the uplink resources conflict, the terminal device may additionally perform an uplink resource selection process during data packet assembly, before data sending, or during data sending, to select a target uplink resource for data transmission from the uplink resources.

Optionally, the terminal device may select the target uplink resource based on different conditions. For example, the terminal device may select an uplink resource corresponding to a service having a high latency requirement. A determining condition for selecting the target uplink resource may be that the terminal device compares physical uplink shared channel (PUSCH) duration of the two uplink resources, where the PUSCH duration may represent a transmission latency on an uplink resource. For example, the terminal device may select an uplink resource with shorter PUSCH duration as the target uplink resource, to ensure the latency requirement.

Alternatively, the terminal device may select an uplink resource corresponding to a service having a high reliability requirement. A determining condition for selecting the target uplink resource may be comparing modulation and coding scheme (MCS) tables of the two uplink resources, where different MCS tables may represent different target block error rates, namely, different block error rates (BLER). For example, the terminal device may alternatively select an uplink resource corresponding to an MCS table corresponding to a smaller target block error rate as the target uplink resource, to ensure reliability.

Alternatively, the terminal device may select an uplink resource on which a logical channel having a relatively high priority is transmitted. A determining condition for selecting the target uplink resource may be comparing priorities of logical channels transmitted on the two uplink resources. When a plurality of logical channels are transmitted on each uplink resource, the determining condition may be comparing highest priorities of the logical channels included on the uplink resources. For example, the terminal device may select an uplink resource corresponding to a data packet associated with a higher highest priority; or determine whether there is a special logical channel in two data packets obtained through packet assembly that are on the two uplink resources, and select an uplink resource corresponding to the special logical channel as the target uplink resource. A data packet in which the special logical channel is located may be used to puncture a data packet in which a common logical channel is located. For example, it is assumed that two logical channels, namely, a first logical channel and a second logical channel, are configured for the terminal device. A network side may configure one piece of indication information for the first logical channel, but not configure the indication information for the second logical channel. The indication information may be used to indicate that the logical channel is a special logical channel. In this case, a data packet in which the first logical channel is located may be used to puncture a data packet in which the second logical channel is located, where the first logical channel may be referred to as a "special logical channel", and the second logical channel may be referred to as a "common logical channel".

Optionally, the determining condition for selecting the target uplink resource by the terminal device may be stipulated in a protocol. If the terminal device determines, based on the determining condition, that the two uplink resources are "the same", the terminal device may select the first uplink resource or the second uplink resource without being restricted by the protocol.

In an example, when at least one of the following conditions is met, the terminal device may determine the second uplink resource as the target uplink resource: PUSCH duration of the second uplink resource is less than PUSCH duration of the first uplink resource; a target block error rate corresponding to an MCS table of the second uplink resource is less than a target block error rate corresponding to an MCS table of the first uplink resource; and a priority of a logical channel transmitted on the second uplink resource is higher than a priority of a logical channel transmitted on the first uplink resource. The case in which the target uplink resource is the second uplink resource is merely used as an example for description. When the first uplink resource and the second uplink resource are interchanged, the first uplink resource may alternatively be selected as the target uplink resource.

Alternatively, the terminal device may select the target uplink resource based on another determining condition. For example, the terminal device may determine the target uplink resource based on a time sequence of receiving control information used to dynamically schedule the resources. In an example, if both the first uplink resource and the second uplink resource are dynamically scheduled resources, the terminal device may determine a resource scheduled later as the target uplink resource. For example, that the terminal device obtains a first uplink resource includes: the terminal device receives first control information from the network device, where the first control information is used to indicate the first uplink resource allocated to the terminal device. That the terminal device obtains a second uplink resource includes: the terminal device receives second control information from the network device, where the second control information is used to indicate the second uplink resource allocated to the terminal device. That the terminal device determines a target uplink resource to be used in an overlapping time domain includes: when a time-domain position of the second control information is after that of the first control information, the terminal device determines the second uplink resource as the target uplink resource. In other words, it may be assumed that the network device can intelligently and dynamically schedule a resource. When the uplink resources conflict, the terminal device may consider that a resource indicated by control information that is sent by the network device later is a preferred resource. For example, still referring to FIG. 3, in the scenario in FIG. 3, the terminal device may select the uplink resource that is used to transmit the URLLC service and that is indicated by the second DCI as the target uplink resource.

S204: The terminal device sends data on the target uplink resource in the overlapping time domain.

The data sent on the target uplink resource is data of a service corresponding to the target uplink resource. For example, if the target uplink resource is the first uplink resource, the terminal device sends the data of the first service on the first uplink resource in the overlapping time domain. If the target uplink resource is the second uplink resource, the terminal device sends the data of the second service on the second uplink resource in the overlapping time domain.

For example, still referring to FIG. 4, in the scenario in FIG. 4, because the URLLC service has a higher latency requirement than the eMBB service, the terminal device may select the uplink resource corresponding to the URLLC service as the target uplink resource. Therefore, in the overlapping time domain, the terminal device may terminate transmission of the eMBB service, and perform data transmission on the uplink resource corresponding to the URLLC service. Optionally, after completing the transmission of the URLLC service, the terminal device may continue to send data on the uplink resource corresponding to the eMBB service.

Optionally, the terminal device may discard the uplink resource other than the target uplink resource. An operation of discarding the uplink resource may be performed by a MAC layer, or may be performed by a physical (PHY) layer. For example, if the MAC layer performs the operation of discarding the uplink resource, the terminal device may perform packet assembly at the MAC layer only for the target uplink resource, and notify the PHY layer to send a data packet. The terminal device does not need to perform packet assembly at the MAC layer for the other uplink resource, in other words, the terminal device discards the other uplink resource at the MAC layer. For another example, if the PHY layer performs the operation of discarding the uplink resource, the terminal device needs to perform packet assembly at the MAC layer for the two uplink resources, and the PHY layer finally determines the target uplink resource; or the MAC layer indicates the target uplink resource to the PHY layer, so that the PHY layer selects a data packet corresponding to the target uplink resource for sending, and a data packet corresponding to the other uplink resource is discarded at the physical layer.

Optionally, the terminal device may alternatively transmit, in a puncturing scheme, a service corresponding to the other uplink resource. The puncturing scheme may mean that the terminal device performs packet assembly at the MAC layer for the two uplink resources, but in the overlapping time domain, one data packet may be used to puncture the other data packet. For example, the two uplink resources may respectively correspond to a first data packet and a second data packet. In the overlapping time domain, sending of the first data packet may be terminated, and only the second data packet is sent. The first data packet continues to be sent after the sending of the second data packet is completed.

A communications system stipulates a retransmission mechanism. Retransmission managed by the media access control (MAC) layer is referred to as a hybrid automatic repeat request (HARQ). In other words, if failing to receive a data packet, a receive end feeds back a negative acknowledgement (NACK) to a transmit end. After receiving the NACK, the transmit end retransmits the data packet that fails to be sent. In this mechanism, because the transmit end may be simultaneously retransmitting or wait to retransmit a plurality of data packets, to accurately identify a data packet that needs to be retransmitted, the concepts of HARQ process and HARQ identifier (ID) are introduced, and each HARQ process corresponds to one HARQ ID. For a dynamically scheduled resource, a HARQ ID corresponding to data may be indicated by DCI sent by the network device. For a preconfigured grant resource, a HARQ ID corresponding to data transmitted on each resource may be calculated based on a time-frequency position of the resource.

A same HARQ process may be used to transmit only one data packet at the same time. For example, one cell may include 16 HARQ processes. This means that a maximum of 16 data packets may be simultaneously transmitted or prepare to be transmitted in one cell.

Therefore, if HARQ processes of the first uplink resource and the second uplink resource are the same, to avoid a process conflict, the terminal device may discard the uplink resource other than the target uplink resource. If HARQ processes of the first uplink resource and the second uplink resource are different, the terminal device may transmit the corresponding service on the uplink resource other than the target uplink resource in a non-overlapping time domain.

In an example, assuming that the target uplink resource is the second uplink resource, and the HARQ process of the first uplink resource is the same as that of the second uplink resource, the terminal device may discard the first uplink resource.

In another example, assuming that the target uplink resource is the second uplink resource, and the HARQ process of the first uplink resource is different from that of the second uplink resource, data corresponding to the two uplink resources may be transmitted in the puncturing scheme. The terminal device may send the first service on a resource other than a third uplink resource in the first uplink resource, where the third uplink resource is a resource that is in the first uplink resource and that overlaps the second uplink resource in time domain. In this solution, the first uplink resource and the second uplink resource may partially overlap in both time domain and frequency domain. The foregoing example is described by using an example in which the target uplink resource is the second uplink resource. The foregoing solution is also applicable when the target uplink resource is the first uplink resource.

In this embodiment of this application, when the uplink resources for different services conflict in time domain, the terminal device may flexibly select the target uplink resource from the first uplink resource or the second uplink resource based on the determining condition, and transmit the data on the target uplink resource in the overlapping time domain, thereby providing a solution to the conflict between the uplink resources.

For the preconfigured grant resource, a timer is further stipulated in a communications protocol. Each HARQ process maintains one timer, and the timer restricts use of a preconfigured grant resource of the corresponding HARQ process. After sending data, the terminal device may start a timer corresponding to a HARQ process. During running of the timer, the terminal device cannot send data on another preconfigured grant resource of the same HARQ process, to avoid overwriting original data with new data before retransmission scheduling from the network device is received. In addition, for dynamic scheduling, if a HARQ process indicated by DCI is a HARQ process associated with some preconfigured grant resources, the terminal device also needs to start a timer corresponding to the HARQ process, to avoid data overwriting. Consequently, the following case occurs: assuming that the first uplink resource is a dynamically scheduled resource, the second uplink resource is a preconfigured grant resource, and HARQ processes of the two uplink resources are the same, if the network device dynamically schedules the first uplink resource, after receiving DCI for scheduling the first uplink resource, the terminal device starts a timer corresponding to the HARQ process, and during running of the timer, the data of the second service arrives; and if the terminal device selects the second uplink resource as the target uplink resource, because the timer corresponding to the HARQ process has been started, the data of the second service cannot be delivered to a HARQ entity, and consequently data packet assembly cannot be completed.

Therefore, in this application, when the dynamically scheduled resource conflicts with the preconfigured grant resource, the terminal device needs to determine whether to start or restart the timer of the corresponding HARQ process, to resolve a problem that after the target uplink resource is selected, the data may fail to be transmitted because the timer of the HARQ process is started. For example, when the terminal device selects the preconfigured grant resource as the target uplink resource, the terminal device skips starting or skips restarting the timer of the HARQ process; otherwise, the terminal device may start or restart the timer of the HARQ process. For example, when at least one of the following conditions is met, the terminal device may select the preconfigured grant resource as the target uplink resource. The conditions include: duration of the preconfigured grant resource is less than PUSCH duration of the dynamically scheduled resource; a target block error rate corresponding to an MCS table of the preconfigured grant resource is less than a target block error rate corresponding to an MCS table of the dynamically scheduled resource; and a priority of a logical channel transmitted on the preconfigured grant resource is higher than a priority of a logical channel transmitted on the dynamically scheduled resource.

In an example, if the first uplink resource is a dynamically scheduled resource, the second uplink resource is a preconfigured grant resource, the target uplink resource is the second uplink resource, and a HARQ process of the first uplink resource is the same as that of the second uplink resource, when the target uplink resource is used to transmit the service, the terminal device skips starting or skips restarting a timer of the HARQ process.

In this embodiment of this application, when the dynamically scheduled resource conflicts with the preconfigured grant resource, the terminal device may determine whether to start or restart the timer of the corresponding HARQ process, to resolve the problem that after the target uplink resource is selected, the data may fail to be transmitted because the timer of the HARQ process is started.

In addition, a repetition mechanism is further introduced into the communications protocol. If repeated transmission is configured for the terminal device, for a resource configured by the network device, the terminal device may consider by default that a resource of a same size exists in K consecutive time units, and the terminal device may repeatedly transmit data for K times in K positions. In other words, the terminal device retransmits the data for K times. K is a positive integer greater than or equal to 2. The quantity K of retransmission times may be configured by the network device for the terminal device. The time unit may be, for example, a symbol or a slot.

In a particular case, the network device may allocate an uplink resource to the terminal device, and configure a quantity of repeated transmission times as K. If second data that needs to be transmitted within a shorter latency arrives when the terminal device transmits first data on the uplink resource, the terminal device can send the second data only after the first data is repeatedly transmitted for K times. Consequently, efficiency of transmitting the second data is affected. Therefore, the embodiments of this application provide a communication method, to configure the terminal device to transmit the second data on a part of the uplink resource used to repeatedly transmit the first data, to reduce a latency of transmitting the second data, thereby improving communication efficiency.

Figure 5:
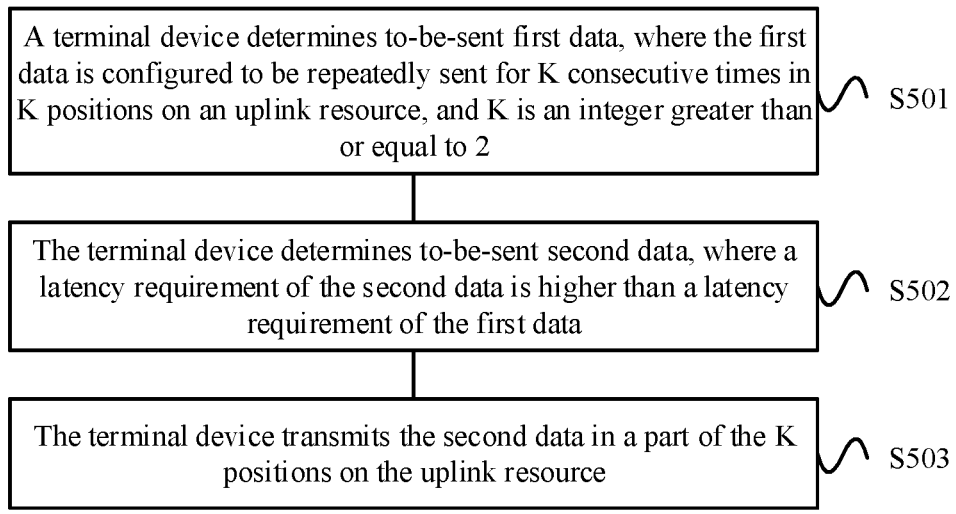
FIG. 5 is a schematic diagram of a communication method according to another embodiment of this application.

FIG. 5 shows a communication method according to another embodiment of this application. As shown in FIG. 5, the method in FIG. 5 includes the following steps.

S501: A terminal device determines to-be-sent first data, where the first data is configured to be repeatedly sent for K consecutive times in K positions on an uplink resource, and K is an integer greater than or equal to 2.

The K positions on the uplink resource may be K positions in a time domain. The K positions may be K consecutive time units, and may be, for example, K symbols or K slots.

Optionally, the uplink resource may be a dynamically scheduled resource, or may be a preconfigured grant resource.

S502: The terminal device determines to-be-sent second data, where a latency requirement of the second data is higher than a latency requirement of the first data.

That a latency requirement of the second data is higher than a latency requirement of the first data may mean that the second data needs to be transmitted within a shorter latency than the first data. In other words, compared with the first data, the second data is required to be sent to a network device within a shorter latency.

Optionally, the latency requirements of the first data and the second data may be determined based on logical channels respectively corresponding to the first data and the second data. For example, if the logical channel of the second data has a higher latency requirement than the logical channel of the first data, it may be considered that the latency requirement of the second data is higher than the latency requirement of the first data. Alternatively, the latency requirements may be determined based on configuration parameters of quality of service (QoS) flows or sessions corresponding to the first data and the second data.

Optionally, the latency requirement may be configured on a network side. For example, the latency requirement may be indicated by configuring a logical channel. In a possible manner, the network side adds one piece of indication information when configuring the logical channel, and the indication information is used to indicate that a latency requirement corresponding to the logical channel is high. In this case, data of the logical channel may interrupt data of a logical channel for which the indication information is not configured. For example, if the indication information is configured for the logical channel corresponding to the second data, and is not configured for the logical channel corresponding to the first data, the second data may interrupt repeated sending of the first data, and occupy the uplink resource used for the first data. In another possible manner, when the network side configures the logical channel, indication information is used to indicate a priority of the latency requirement. For example, if the indication information indicates that the latency requirement has a "high priority", it is considered that data of the logical channel has a high latency requirement, and may interrupt data of a logical channel for which indication information indicating a "low priority" is configured.

In this case, if data corresponds to a plurality of logical channels, when the indication information is configured for any one of the plurality of logical channels or indication information configured for any one of the plurality of logical channels indicates a "high priority", it is considered that a latency requirement of the data has a high priority.

Optionally, the latency requirement may alternatively be indicated by using a priority of the logical channel. If data corresponds to a logical channel having a relatively high priority, it may be considered that a latency requirement corresponding to the data also has a high priority. In this case, if data corresponds to a plurality of logical channels, a highest priority in the plurality of logical channels may be used as a priority of the data.

The first data and the second data may belong to a service of a same type, for example, a URLLC service. Alternatively, the first data and the second data may belong to services of different types. For example, the first data belongs to an eMBB service, and the second data belongs to a URLLC service.

S503: The terminal device transmits the second data in a part of the K positions on the uplink resource.

The part of the K positions may be any of the K positions. For example, the terminal device may transmit the first data in the first M of the K positions on the uplink resource, and transmit the second data in the last K−M positions on the uplink resource, where M is an integer greater than or equal to 1, and M<K. In other words, the terminal device may repeatedly transmit the first data for M times and transmit the second data for K−M times on the uplink resource.

Figure 6:
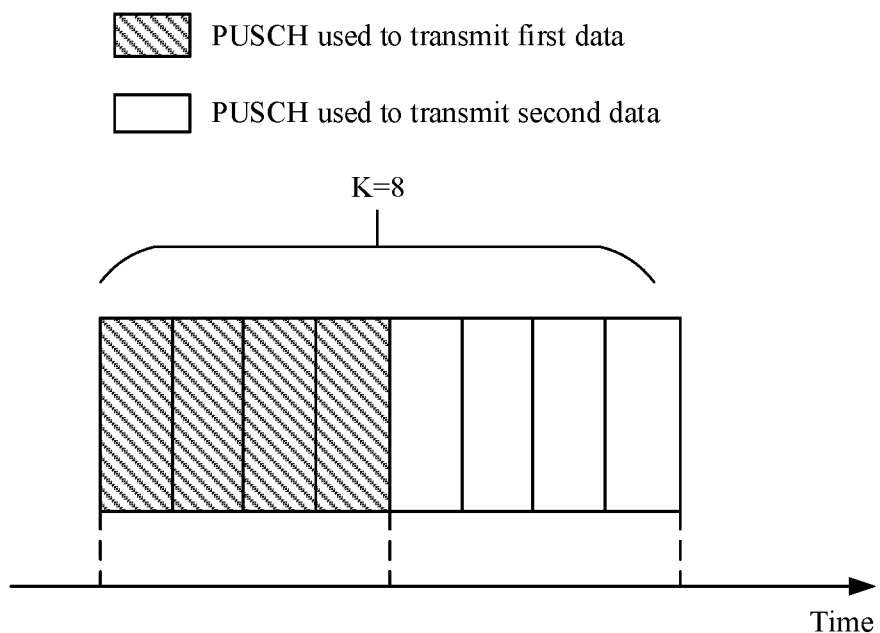
FIG. 6 is a schematic diagram of resource distribution according to another embodiment of this application.

For example, if the first data corresponds to a first logical channel, the second data corresponds to a second logical channel, the terminal device is configured to repeatedly transmit the first data for eight times on the uplink resource, and in a process in which the terminal device transmits the data of the first logical channel on the uplink resource, the second data of the second logical channel arrives; and if a latency requirement of the second logical channel is higher than a latency requirement of the first logical channel, the terminal device may terminate data transmission on the first logical channel, and transmit the second data of the second logical channel on a remaining uplink resource. For example, FIG. 6 is a schematic diagram of resource distribution according to another embodiment of this application. As shown in FIG. 6, a PUSCH may be sent on the uplink resource. The terminal device may repeatedly transmit the first data for four times, and then repeatedly transmit the second data for four times.

In this embodiment of this application, the terminal device may send the second data on a part of the uplink resource configured to send the first data, to reduce a latency of sending the second data, and improve communication efficiency.

Optionally, the network device may directly send indication information to the terminal device, to indicate that the second data can occupy an uplink resource used to repeatedly transmit other data. Alternatively, the network device may configure a preset condition. When the preset condition is met, the second data may occupy an uplink resource used to repeatedly transmit other data. For example, the network device may configure whether data corresponding to a logical channel, a quality of service (QoS) flow, or a session can occupy an uplink resource used to repeatedly transmit other data. If a logical channel, a QoS flow, or a session corresponding to the second data meets the foregoing requirement, the second data may occupy the uplink resource used to repeatedly transmit other data (for example, the first data).

The foregoing describes the communication method in the embodiments of this application with reference to FIG. 1 to FIG. 6. The following describes apparatuses in the embodiments of this application with reference to the accompanying drawings.

Figure 7:
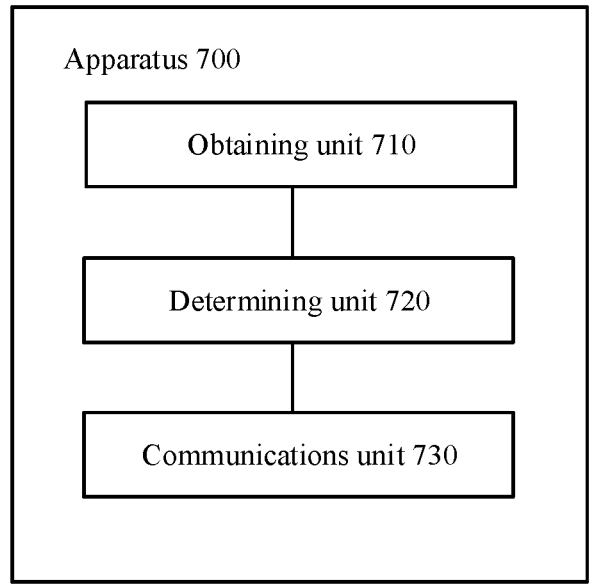
FIG. 7 is a schematic structural diagram of an apparatus according to an embodiment of this application.

FIG. 7 is a schematic structural diagram of an apparatus 700 according to an embodiment of this application. The apparatus includes units that can implement steps performed by the terminal device in the foregoing embodiments. For example, the apparatus 700 may perform the method shown in FIG. 2. The apparatus 700 includes an obtaining unit 710, a determining unit 720, and a communications unit 730.

The obtaining unit 710 is configured to obtain a first uplink resource, where the first uplink resource is used to send a first service. The obtaining unit 710 is further configured to obtain a second uplink resource, where the second uplink resource is used to send a second service, and the first uplink resource and the second uplink resource completely or partially overlap in time domain.

The determining unit 720 is configured to determine a target uplink resource to be used in an overlapping time domain, where the target uplink resource is the first uplink resource or the second uplink resource.

The communications unit 730 is configured to send data on the target uplink resource in the overlapping time domain.

Figure 8:
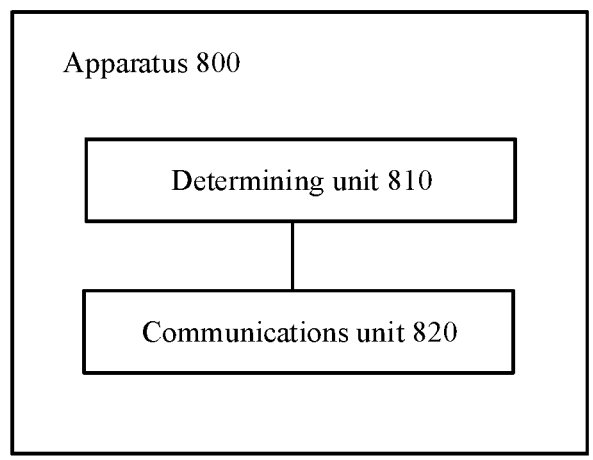
FIG. 8 is a schematic structural diagram of an apparatus according to another embodiment of this application.

FIG. 8 is a schematic structural diagram of an apparatus 800 according to an embodiment of this application. The apparatus includes units that can implement steps performed by the terminal device in the foregoing embodiments. For example, the apparatus 800 may perform the method shown in FIG. 5. The apparatus 800 includes a determining unit 810 and a communications unit 820.

The determining unit 810 is configured to determine to-be-sent first data, where the first data is configured to be repeatedly sent for K consecutive times in K positions on an uplink resource, and K is an integer greater than or equal to 2. The determining unit 810 is further configured to determine to-be-sent second data, where a latency requirement of the second data is higher than a latency requirement of the first data.

The communications unit 820 is configured to transmit the second data in a part of the K positions on the uplink resource.

It should be understood that division the apparatus into the units is merely division into logical functions. In an actual implementation, all or some of the units may be integrated into a physical entity, or may be physically separate. In addition, all the units in the apparatus may be implemented in a form of software invoked by a processing element, or may be implemented in a form of hardware; or some units may be implemented in a form of software invoked by a processing element, and some units may be implemented in a form of hardware. For example, each unit may be an independently disposed processing element, or may be integrated into a chip of the apparatus for implementation. Alternatively, each unit may be stored in a memory in a form of a program to be invoked by a processing element of the apparatus to perform a function of the unit. In addition, all or some of the units may be integrated together, or may be implemented independently. The processing element herein may also be referred to as a processor, and may be an integrated circuit having a signal processing capability. In an implementation process, the steps in the foregoing methods or the foregoing units may be implemented by using a hardware integrated logic circuit in the processing element, or may be implemented in a form of software invoked by the processing element.

In an example, a unit in any one of the foregoing apparatuses may be one or more integrated circuits configured to implement the foregoing methods, for example, one or more application-specific integrated circuits (ASIC), one or more microprocessors (DSP), one or more field programmable gate arrays (FPGA), or a combination of at least two of these forms of integrated circuits. For another example, when a unit in the apparatus may be implemented by a program scheduled by a processing element, the processing element may be a general-purpose processor, for example, a central processing unit (CPU) or another processor that can invoke the program. For still another example, the units may be integrated and implemented in a form of a system-on-a-chip (SOC).

The foregoing communications unit may be an interface circuit of the apparatus, and is configured to receive a signal from another apparatus, or is configured to send a signal to another apparatus. For example, when the apparatus is implemented in a form of a chip, the communications unit is an interface circuit used by the chip to receive a signal from another chip or apparatus, or is an interface circuit used by the chip to send a signal to another chip or apparatus.

Figure 9:
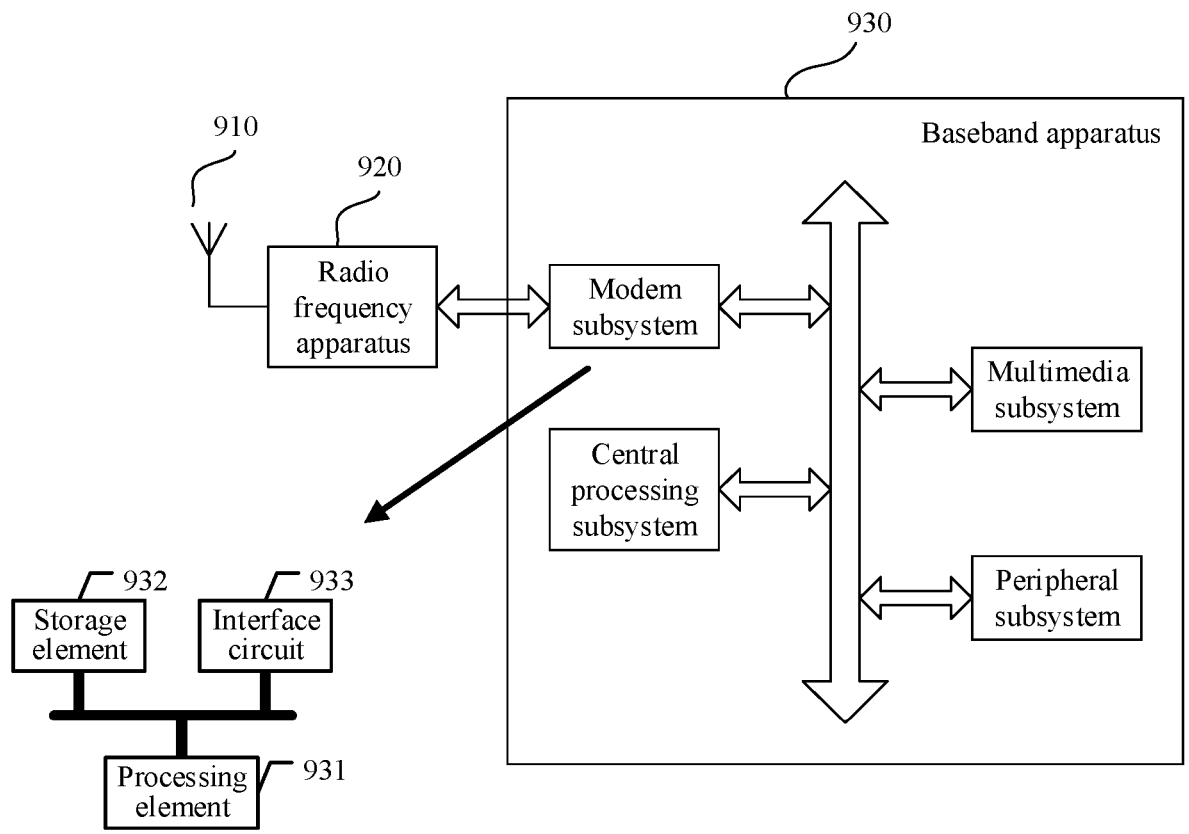
FIG. 9 is a schematic structural diagram of a terminal device according to an embodiment of this application.

FIG. 9 is a schematic structural diagram of a terminal device 900 according to an embodiment of this application. The terminal device 900 may be the terminal device in the foregoing embodiments and is configured to implement operations of the terminal device in the foregoing embodiments. For example, the terminal device 900 may implement the method performed by the terminal device in FIG. 2 or FIG. 5. As shown in FIG. 9, the terminal device 900 includes an antenna 910, a radio frequency part 920, and a signal processing part 930. The antenna 910 is connected to the radio frequency part 920. In a downlink direction, the radio frequency part 920 receives, through the antenna 910, information sent by a network device, and sends, to the signal processing part 930 for processing, the information sent by the network device. In an uplink direction, the signal processing part 930 processes information of the terminal device, and sends the information to the radio frequency part 920. The radio frequency part 920 processes the information of the terminal device, and then sends the processed information to the network device through the antenna 910.

The signal processing part 930 may include a modem subsystem, configured to process data at each communications protocol layer. The signal processing part 930 may further include a central processing subsystem, configured to process an operating system and an application layer of the terminal device. In addition, the signal processing part 930 may further include another subsystem, for example, a multimedia subsystem, or a peripheral subsystem. The multimedia subsystem is configured to control a camera or a screen display of the terminal device. The peripheral subsystem is configured to connect to another device. The modem subsystem may be a separately disposed chip. Optionally, the foregoing apparatus used for the terminal device may be located in the modem subsystem.

The modem subsystem may include one or more processing elements 931, for example, include one main control CPU and another integrated circuit. In addition, the modem subsystem may further include a storage element 932 and an interface circuit 933. The storage element 932 is configured to store data and a program. However, a program used to perform the methods performed by the terminal device in the foregoing methods may not be stored in the storage element 932, but is stored in a memory outside the modem subsystem, and is loaded by the modem subsystem for use. The interface circuit 933 is configured to communicate with another subsystem. The foregoing apparatus used for the terminal device may be located in the modem subsystem, and the modem subsystem may be implemented by a chip. The chip includes at least one processing element and interface circuit. The processing element is configured to perform the steps in any one of the methods performed by the terminal device. The interface circuit is configured to communicate with another apparatus. In an implementation, units of the terminal device that implement the steps in the foregoing methods may be implemented by a program scheduled by a processing element. For example, the apparatus used for the terminal device includes a processing element and a storage element. The processing element invokes a program stored in the storage element, to perform the methods performed by the terminal device in the foregoing method embodiments. The storage element may be a storage element located on a same chip as the processing element, namely, an on-chip storage element.

In another implementation, the program used to perform the methods performed by the terminal device in the foregoing methods may be in a storage element located on a different chip from the processing element, namely, an off-chip storage element. In this case, the processing element invokes or loads the program from the off-chip storage element to the on-chip storage element, to invoke and perform the methods performed by the terminal device in the foregoing method embodiments.

In still another implementation, units of the terminal device that implement the steps in the foregoing methods may be configured as one or more processing elements. These processing elements are disposed in the modem subsystem. The processing element herein may be an integrated circuit, for example, one or more ASICs, one or more DSPs, one or more FPGAs, or a combination of these types of integrated circuits. These integrated circuits may be integrated together to form a chip.

Units of the terminal device that implement the steps in the foregoing methods may be integrated together, and implemented in a form of a system-on-a-chip (SOC). The SOC chip is configured to implement the foregoing methods. At least one processing element and storage element may be integrated into the chip, and the processing element invokes a program stored in the storage element to implement the foregoing methods performed by the terminal device. Alternatively, at least one integrated circuit may be integrated into the chip, to implement the foregoing methods performed by the terminal device. Alternatively, with reference to the foregoing implementations, functions of some units may be implemented by the processing element invoking a program, and functions of some units may be implemented by the integrated circuit.

It can be learned that the foregoing apparatus used for the terminal device may include at least one processing element and interface circuit. The at least one processing element is configured to perform any one of the methods performed by the terminal device that are provided in the foregoing method embodiments. The processing element may perform some or all steps performed by the terminal, in a first manner, to be specific, by invoking the program stored in the storage element; or may perform some or all steps performed by the terminal device, in a second manner, to be specific, by using a hardware integrated logic circuit in the processing element in combination with an instruction; or may certainly perform, by combining the first manner and the second manner, some or all steps performed by the terminal device.

As described above, the processing element herein may be a general-purpose processor, for example, a CPU, or may be one or more integrated circuits configured to implement the foregoing methods, for example, one or more ASICs, one or more microprocessors DSPs, one or more FPGAs, or a combination of at least two of these forms of integrated circuits.

The storage element may be one memory, or may be a general term of a plurality of storage elements.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for detailed working processes of the foregoing system, apparatus, and unit, refer to corresponding processes in the foregoing method embodiments, and details are not described herein again.

In the several embodiments provided in this application, it should be understood that the disclosed system, apparatus, and method may be implemented in other manners. For example, the described apparatus embodiments are merely examples. For example, division into units is merely division into logical functions and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or another form.

The units described as separate parts may or may not be physically separate, and parts displayed as units may or may not be physical units, that is, may be located in one position, or may be distributed on a plurality of network units. Some or all of the units may be selected based on an actual requirement to achieve the objectives of the solutions of the embodiments.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps in the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
   obtaining, by a terminal device, a first uplink resource, wherein the first uplink resource is used to send a data packet of a first service to a network device;
   obtaining, by the terminal device, a second uplink resource, wherein the second uplink resource is used to send a data packet of a second service to the network device, and the first uplink resource and the second uplink resource completely or partially overlap in a time domain;
   responsive to determining that at least one of a number of conditions is met, determining, by the terminal device, that a target uplink resource to be used in the time domain is the second uplink resource, and wherein the number of conditions include:

a target block error rate corresponding to a modulation and coding scheme (MCS) table of the second uplink resource is less than a target block error rate corresponding to an MCS table of the first uplink resource, and a priority of a logical channel corresponding to the data packet of the second service transmitted on the second uplink resource is higher than a priority of a logical channel corresponding to the data packet of the first service transmitted on the first uplink resource;

sending, by the terminal device, data on the target uplink resource in the time domain; and responsive to determining that the target uplink resource is the second uplink resource and a hybrid automatic repeat request (HARQ) process of the first uplink resource is different from that of the second uplink resource, sending, by the terminal device, data of the first service on a resource other than a third uplink resource in the first uplink resource, wherein the third uplink resource is a resource that is in the first uplink resource and that overlaps the second uplink resource in the time domain.

2. The method according to claim 1, wherein the number of conditions further includes:

a physical uplink shared channel (PUSCH) duration of the second uplink resource is less than a PUSCH duration of the first uplink resource.

3. The method according to claim 2, wherein the method further comprises:

discarding the first uplink resource.

4. The method according to claim 2, wherein the method further comprises:

performing packet assembly at a media access control (MAC) layer only for the target uplink resource.

5. The method according to claim 2, wherein the method further comprises:

performing packet assembly at a media access control (MAC) layer for both the first uplink resource and the second uplink resource; and sending the data packet of the first service corresponding to the target uplink resource and discarding the data packet of the second service corresponding to the target uplink resource at a physical layer.

6. The method according to claim 1, wherein both the first uplink resource and the second uplink resource are preconfigured grant resources.

7. The method according to claim 1, wherein the obtaining, by the terminal device, the first uplink resource comprises:

receiving, by the terminal device, first control information from a network device, wherein the first control information is used to indicate the first uplink resource allocated to the terminal device; and the obtaining, by the terminal device, the second uplink resource comprises:

receiving, by the terminal device, second control information from the network device, wherein the second control information is used to indicate the second uplink resource allocated to the terminal device.

8. The method according to claim 7, wherein the determining, by the terminal device, the target uplink resource to be used in the time domain comprises:

responsive to determining that a time-domain position of the second control information is after that of the first control information, determining, by the terminal device, the second uplink resource as the target uplink resource.

9. An apparatus comprising:

a memory; and one or more processors coupled to the memory, wherein the one or more processors are configured to:

obtain a first uplink resource, wherein the first uplink resource is used to send a data packet of a first service to a network device;

obtain a second uplink resource, wherein the second uplink resource is used to send a data packet of a second service to the network device, and the first uplink resource and the second uplink resource completely or partially overlap in a time domain;

responsive to determining that at least one of a number of conditions is met, determine that a target uplink resource to be used in the time domain is the second uplink resource, and wherein the number of conditions includes:

a target block error rate corresponding to a modulation and coding scheme (MCS) table of the second uplink resource is less than a target block error rate corresponding to an MCS table of the first uplink resource, and a priority of a logical channel corresponding to the data packet of the second service transmitted on the second uplink resource is higher than a priority of a logical channel corresponding to the data packet of the first service transmitted on the first uplink resource;

send data on the target uplink resource in the time domain; and responsive to determining that the target uplink resource is the second uplink resource and a hybrid automatic repeat request (HARQ) process of the first uplink resource is different from that of the second uplink resource, send data of the first service on a resource other than a third uplink resource in the first uplink resource, wherein the third uplink resource is a resource that is in the first uplink resource and that overlaps the second uplink resource in the time domain.

10. The apparatus according to claim 9, wherein the number of conditions further includes:

a physical uplink shared channel (PUSCH) duration of the second uplink resource is less than a PUSCH duration of the first uplink resource.

11. The apparatus according to claim 10, wherein the one or more processors are further configured to discard the first uplink resource.

12. The apparatus according to claim 10, wherein the one or more processors are further configured to:

perform packet assembly at a media access control (MAC) layer only for the target uplink resource.

13. The apparatus according to claim 10, wherein the one or more processors are further configured to:

perform packet assembly at a media access control (MAC) layer for both the first uplink resource and the second uplink resource; and send the data packet of the first service corresponding to the target uplink resource and discard the data packet of the second service corresponding to the target uplink resource at a physical layer.

14. The apparatus according to claim 9, wherein both the first uplink resource and the second uplink resource are preconfigured grant resources.

15. A non-transitory readable storage medium, storing a program that, when executed by a processor, causes the processor to provide at least the following operations:
  obtaining a first uplink resource, wherein the first uplink resource is used to send a data packet of a first service to a network device;
  obtaining a second uplink resource, wherein the second uplink resource is used to send a data packet of a second service to the network device, and the first uplink resource and the second uplink resource completely or partially overlap in a time domain;
  responsive to determining that at least one of a number of conditions is met, determining that a target uplink resource to be used in the time domain is the second uplink resource, and wherein the number of conditions includes:
    a target block error rate corresponding to a modulation and coding scheme (MCS) table of the second uplink resource is less than a target block error rate corresponding to an MCS table of the first uplink resource, and
    a priority of a logical channel corresponding to the data packet of the second service transmitted on the second uplink resource is higher than a priority of a logical channel corresponding to the data packet of the first service transmitted on the first uplink resource;
  sending data on the target uplink resource in the time domain; and
  responsive to determining that the target uplink resource is the second uplink resource and a hybrid automatic repeat request (HARQ) process of the first uplink resource is different from that of the second uplink resource, sending data of the first service on a resource other than a third uplink resource in the first uplink resource, wherein the third uplink resource is a resource that is in the first uplink resource and that overlaps the second uplink resource in the time domain.

16. The non-transitory readable storage medium according to claim 15, wherein the number of conditions further includes:
  a physical uplink shared channel (PUSCH) duration of the second uplink resource is less than a PUSCH duration of the first uplink resource.

17. The non-transitory readable storage medium according to claim 16, wherein the program, when executed by the processor, causes the processor to further provide an operation for: discarding the first uplink resource.

18. The non-transitory readable storage medium according to claim 16, wherein the program, when executed by the processor, causes the processor to further provide an operation for:
  performing packet assembly at a media access control (MAC) layer only for the target uplink resource.

19. The non-transitory readable storage medium according to claim 16, wherein the program, when executed by the processor, causes the processor to further provide operations for:
  performing packet assembly at a media access control (MAC) layer for both the first uplink resource and the second uplink resource; and
  sending the data packet of the first service corresponding to the target uplink resource and discarding the data packet of the second service corresponding to the target uplink resource at a physical layer.

20. The non-transitory readable storage medium according to claim 15, wherein both the first uplink resource and the second uplink resource are preconfigured grant resources.

* * * * *

UNITED STATES PATENT AND TRADEMARK OFFICE
CERTIFICATE OF CORRECTION

| | |
|---|---|
| PATENT NO. | : 12,047,982 B2 |
| APPLICATION NO. | : 17/214786 |
| DATED | : July 23, 2024 |
| INVENTOR(S) | : Lou et al. |

Page 1 of 1

It is certified that error appears in the above-identified patent and that said Letters Patent is hereby corrected as shown below:

On the Title Page

Item (56) References Cited, Other Publications, Right-Hand Column, NPL Citation #1: reads as "WGI" should read as -- WG1 --.

Signed and Sealed this
Thirteenth Day of May, 2025

Coke Morgan Stewart
*Acting Director of the United States Patent and Trademark Office*